United States Patent [19]

Hatz

[11] 4,215,664

[45] Aug. 5, 1980

[54] INTERNAL COMBUSTION ENGINE WITH A SOUND-PROOFING SHELL

[75] Inventor: Ernst Hatz, Ruhstorf, Fed. Rep. of Germany

[73] Assignee: Motorenfabrik Hatz GmbH & Co. KG, Ruhstorf, Fed. Rep. of Germany

[21] Appl. No.: 932,788

[22] Filed: Aug. 11, 1978

[30] Foreign Application Priority Data

Sep. 5, 1977 [DE] Fed. Rep. of Germany ....... 2739944

[51] Int. Cl.³ ............................................. F02B 77/00
[52] U.S. Cl. ........................... 123/195 C; 123/198 E; 181/204
[58] Field of Search ............ 123/198 E, 195 C, 195 S; 181/204

[56] References Cited

U.S. PATENT DOCUMENTS

| | | | |
|---|---|---|---|
| 3,656,466 | 4/1972 | Dzus | 123/198 E |
| 3,695,385 | 10/1972 | Thien et al. | 123/195 C |
| 3,924,597 | 12/1975 | Hatz et al. | 123/198 E |
| 4,027,644 | 6/1977 | Timour | 123/198 E |
| 4,066,058 | 1/1978 | Anderkay | 123/198 E |
| 4,137,888 | 2/1979 | Allan | 123/198 E |

*Primary Examiner*—Ira S. Lazarus
*Attorney, Agent, or Firm*—Blanchard, Flynn, Thiel, Boutell & Tanis

[57] ABSTRACT

To compensate for positional variations during assembly or in use between an engine body or crankcase and a sound-proofing shell enclosing the same, use is made of interposed spring arrangements including a load-setting means.

6 Claims, 4 Drawing Figures

INTERNAL COMBUSTION ENGINE WITH A SOUND-PROOFING SHELL

FIELD OF THE INVENTION

This invention relates to an internal combustion engine having a sound-proofing shell which is detachably connected to the casing of the engine by suspension elements (see U.S. Pat. No. 3,924,597) and, more particularly, to an adjustable spacer arrangement between the engine body and the shell.

BACKGROUND OF THE INVENTION

In internal combustion engines of this kind, there are frequently minor variations in the relative positioning of the engine body or crankcase and the shell due to manufacturing tolerances and/or differing weights of the shell or the assembly carried thereby (fuel tank, oil cooler or the like). Moreover the intrinsic vibration frequency or characteristic of the shell and, therefore, the sound dissemination thereof is influenced by various factors (engine speed, inertial forces and the like).

It is an object of the present invention to provide means to enable variations of position between the engine body or crankcase and the shell to be compensated for and the intrinsic vibrations of the shell corrected. In accordance with the invention, at least one spring arrangement is provided between the engine body or crankcase and the shell detachably connected thereto by suspension elements, in which arrangement at least one spring means is provided between the engine body or crankcase and the shell preferably at a lower part of the engine, said arrangement being adjustable in effect by an adjusting device.

Where use is made of springs of constant pitch, the axial lengths of the springs can be varied by means of the adjusting member while still retaining the spring constants and thus any variation in position eliminated. Where use is made of springs of progressive pitch, not only can intrinsic vibration of the shell be corrected but also, for example by inserting washers, variations in position between the parts can additionally be compensated.

BRIEF DESCRIPTION OF THE DRAWINGS

Embodiments of the spring arrangement according to the invention are described below with reference to the accompanying drawings, in which.

DETAILED DESCRIPTION

Figure 1:
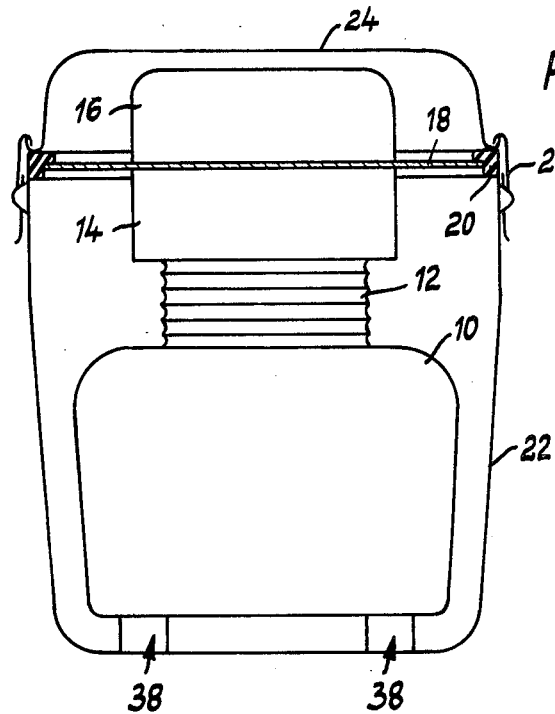
FIG. 1 is a diagrammatic illustration of an internal combustion engine and its shell.

FIG. 1 particularly illustrates, by way of example, a single cylinder internal combustion engine of a known type. It comprises a crankcase 10, a cylinder 12, a cylinder head 14 and a cover 16 which encloses the valve gearing. Fixed between the cylinder head 14 and the cover 16 is a support plate 18 which supports a multi-part noise-deadening shell 22. An interposed sealing strip 20 is provided between the support plate 18 and the shell. The shell surrounds the engine casing. An upper shell 24 encloses the upper part of the engine body. The shell 22 comprises a number of individual shells which are detachably connected to the support plate 18 by means of releasable fasteners, for example snap fasteners 26. Details of a sound-deadening shell of this nature for an internal combustion engine are, for example, described in detail in U.S. Pat. No. 3,924,597 and need not, therefore, be further dealt with here.

Figure 2:
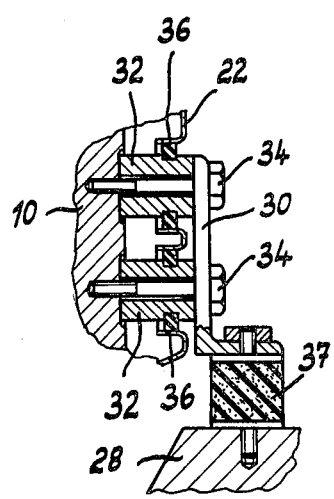
FIG. 2 shows a detail of the anchorage of the engine.

To anchor the engine to the engine mounting structure use is made of feet, for example two feet, each of which is in the form of an angle piece 30, as shown in FIG. 2. Each angle piece 30 is fastened to the crankcase 10 by means of a spacer piece 32 and screws 34, which spacer and screws extend through openings in the shell 22. A rubber buffer 37 for damping vibrations is inserted between the angle piece 30 and engine mounting structure 28. Each spacer 32 is also isolated by means of an annular rubber element 36 from the shell 22.

Positional variations between the shell 22 and the crankcase 10 occur in the lower region of the engine for reasons of variations in tolerances during manufacture and frequently also on account of differing weights sustained by the shell, for example in view of the installation of a fuel tank or oil cooler on the shell. It is, therefore, necessary to compensate for these positional variations. In this regard, it has been found that rubber elements are unsuitable as compensation means because they do not have the required resistance to heat and attack by fuel. Again a considerable obstacle results from aging and variations of the spring characteristics of the rubber elements caused by heavy temperature stresses.

In accordance with the present invention, therefore, to provide the necessary compensation a spring arrangement is provided between the shell 22 and crankcase 10. In FIG. 1, two spring arrangements 38 of the same kind are provided in the lower region of the engine, and these arrangements are described in detail below. It will be understood that further such spring arrangements may be provided dependent on the size of the engine or the number of engine cylinders.

Figure 3:
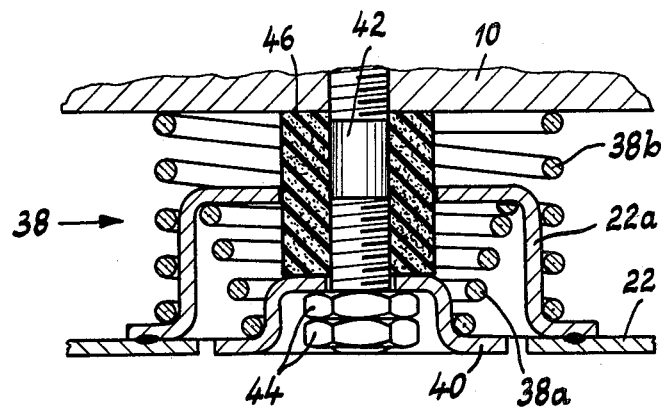
FIGS. 3 and 4 show two different embodiments of the spring arrangement.

Each spring arrangement 38 (see FIG. 3) comprises a spiral or conical spring 38a and a cylindrical counter spring 38b. Each of these two springs has a constant pitch. One end of the spring 38a bears against a cup or cup-shaped wall segment 22a firmly connected to shell 22 as by welding. The other end of this spring 38a bears against a spring plate 40 which is adjustably fastened by nuts 44 on a threaded bolt 42 mounted in the crankcase 10. The counter spring 38b is concentric with spring 38a and is inserted between the crankcase 10 and the shell 22 in the manner illustrated. A sealing sleeve 46 of soft material, for example sponge rubber, merely has a sealing function.

During assembly, by adjusting the spring plate 40 on the threaded bolt 42, the axial lengths of the springs 38a and 38b can be varied to compensate for prescribed positional variations or tolerances between the shell 22 and the crankcase 10. During this compensation the spring constants of the two springs are maintained.

Figure 4:
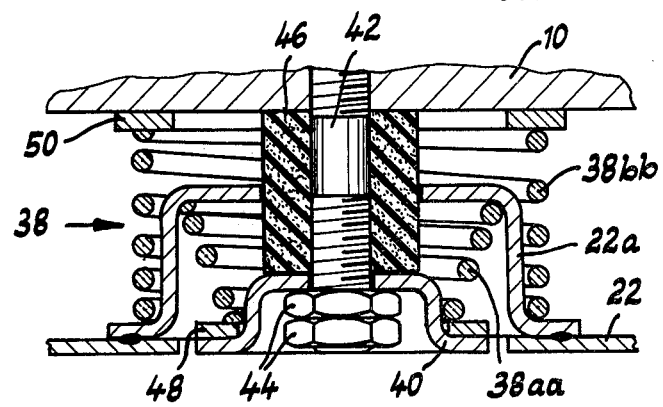

In a similar spring arrangement in FIG. 4, the two springs 38aa and 38bb are springs of progressive pitch. The intrinsic oscillation of the shell is corrected and suited to the prescribed operating conditions by adjusting the spring plate 40 on the threaded bolt 42 and thereby varying the spring performances. Furthermore, the spacing between the shell 22 and the casing 10 is adjusted by the insertion of washers 48 and 50. The arrangement of FIG. 4 thus permits both the correction of the spacing and the intrinsic oscillation frequency or characteristic of the shell 22.

Thus positional tolerances of the shell are easily corrected by means of the spring arrangements described above. The intrinsic oscillation frequency or characteristic of the shell and consequently its noise dissemination, occasioned by the speed of the engine or the masses involved and other factors, can also be dealt with by means of the spring arrangements described. Thus a multi-function correction means for the shell has been achieved using very simple constructional parts.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An internal combustion engine, comprising:
a sound-deadening shell enclosing an engine body and detachably connected thereto at least one spring arrangement provided between said engine body and said shell, said spring arrangement having first and second axial springs and being adjustable by an adjusting means composed of a threaded bolt firmly seated in the engine body and a spring plate adjustably positioned on said bolt, said first spring bearing with one end against said spring plate and with other end against said shell, and said second spring being inserted between said engine body and said shell, whereby the axial length of said first and second springs is simultaneously and continuously variable by adjusting the relative position of said spring plate on said bolt.

2. An internal combustion engine according to claim 1, wherein the two springs have a constant pitch.

3. An internal combustion engine according to claim 1, wherein the two springs have a progressively increasing pitch.

4. An internal combustion engine according to claim 1, wherein said first and second springs each extend coaxially of said bolt.

5. An internal combustion engine according to claim 4, wherein said shell includes a cup-shaped wall segment having means defining an opening therethrough, said first spring engaging and extending between said spring plate and the bottom of said cup-shaped wall segment, said second spring engaging and extending between said bottom of said cup-shaped wall segment, on a side thereof remote from said first spring, and said engine body, said bolt extending through said opening.

6. An internal combustion engine according to claim 5, including a sealing sleeve encircling said bolt and engaging and extending between said bottom of said cup-shaped wall segment and said engine body.

* * * * *